(12) United States Patent
Brown et al.

(10) Patent No.: US 8,041,290 B2
(45) Date of Patent: *Oct. 18, 2011

(54) TRACKING LOCALLY BROADCAST ELECTRONIC WORKS

(75) Inventors: Michael Wayne Brown, Georgetown, TX (US); Michael A. Paolini, Austin, TX (US); Newton James Smith, Jr., Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 780 days.

This patent is subject to a terminal disclaimer.

(21) Appl. No.: 12/057,248

(22) Filed: Mar. 27, 2008

(65) Prior Publication Data

US 2008/0176507 A1 Jul. 24, 2008

Related U.S. Application Data

(63) Continuation of application No. 10/728,161, filed on Dec. 4, 2003, now Pat. No. 7,519,322.

(51) Int. Cl.
*H04H 60/33* (2008.01)

(52) U.S. Cl. .................. 455/2.01; 455/67.11; 455/414.1; 455/3.03

(58) Field of Classification Search ............... 455/67.11, 455/419, 3.01, 3.03, 3.06, 420, 418, 414.1, 455/67.16, 2.01; 704/200.1, 270; 705/26, 705/14

See application file for complete search history.

(56) References Cited

U.S. PATENT DOCUMENTS 5,247,293 A 9/1993 Nakagawa 6,356,934 B1 3/2002 Delph
(Continued)

FOREIGN PATENT DOCUMENTS

CN 1371056 A 9/2002
(Continued)

OTHER PUBLICATIONS

U.S. Appl. No. 12/056,075, filed Mar. 26, 2008, Michael Wayne Brown, Office Action, mailed Jan. 6, 2011, 15 pages.
(Continued)

*Primary Examiner* — John J Lee
(74) *Attorney, Agent, or Firm* — David A. Mims, Jr.; Amy J. Pattillo

(57) ABSTRACT

A method, system, and program for tracking locally broadcast electronic works are provided. According to one aspect of the invention, a sending player locally broadcasts an electronic work. In particular, the local broadcast may be a wireless broadcast creating an ad-hoc radio system. At least one recipient player receives the localized broadcast of the electronic work and accepts a distribution cookie for tracking distribution of the electronic work. The at least one recipient player updates the distribution cookie with tracking information about the broadcast of the electronic work, including ratings by users at the second player and purchase of the broadcast electronic work. Each of the at least one recipient players may in turn become a sending player that broadcasts the electronic work to other recipient players and requires the other recipient players to accept a copy of the distribution cookie updated by the second player. Then, responsive to detecting a network connection to a statistics server, the at least one recipient player provides the distribution cookie to the statistics server, such that localized broadcast distribution of the electronic work is tracked.

18 Claims, 10 Drawing Sheets

U.S. PATENT DOCUMENTS

| | | |
|---|---|---|
| 7,027,832 B2 | 4/2006 | Gum |
| 7,203,456 B1 | 4/2007 | Beard et al. |
| 7,515,873 B2 | 4/2009 | Brown |
| 2002/0040255 A1 | 4/2002 | Neoh |
| 2002/0067805 A1 | 6/2002 | Andrews |
| 2002/0074413 A1 | 6/2002 | Henzerling |
| 2002/0132585 A1 | 9/2002 | Palermo |
| 2002/0168938 A1 | 11/2002 | Chang |
| 2002/0184038 A1* | 12/2002 | Costello et al. ............... 704/500 |
| 2003/0002849 A1 | 1/2003 | Lord |
| 2003/0024375 A1 | 2/2003 | Sitrick |
| 2003/0073432 A1 | 4/2003 | Meade, II |
| 2003/0073460 A1 | 4/2003 | Van Pelt |
| 2003/0083013 A1 | 5/2003 | Mowenz et al. |
| 2003/0108164 A1 | 6/2003 | Laurin et al. |
| 2004/0058662 A1 | 3/2004 | Gieske et al. |
| 2004/0153767 A1 | 8/2004 | Dolgonos |
| 2004/0248603 A1 | 12/2004 | Canoy |
| 2005/0004873 A1* | 1/2005 | Pou et al. ........................ 705/51 |
| 2005/0086683 A1 | 4/2005 | Meyerson |
| 2005/0125221 A1 | 6/2005 | Brown et al. |
| 2005/0125302 A1 | 6/2005 | Brown et al. |
| 2006/0053080 A1* | 3/2006 | Edmonson et al. ............. 705/59 |
| 2007/0178830 A1 | 8/2007 | Janik et al. |
| 2008/0177549 A1 | 7/2008 | Brown |

FOREIGN PATENT DOCUMENTS

| | | |
|---|---|---|
| JP | 09-160899 | 6/1997 |
| JP | 2001-344369 | 12/2001 |
| JP | 2002-133062 | 5/2002 |
| JP | 2002-203070 | 7/2002 |
| JP | 2002-259605 | 9/2002 |
| JP | 2002-262227 | 9/2002 |
| JP | 2003-198544 | 7/2003 |
| JP | 2003-228657 | 8/2004 |
| JP | 2005-514703 | 5/2005 |

OTHER PUBLICATIONS

US Patent 7515873, issued Apr. 7, 2009, Office Action, mailed Apr. 15, 2008, 5 pages.

US Patent 7515873, issued Apr. 7, 2009, Notice of Allowance, mailed Sep. 9, 2008, 6 pages.

US Patent 7519322, issued Apr. 14, 2009, Office Action, mailed Apr. 15, 2008, 5 pages.

US Patent 7519322, issued Apr. 14, 2009, Notice of Allowance, mailed Sep. 5, 2008, 6 pages.

US Patent 7620362, issued Nov. 17, 2009, Office Action, mailed Nov. 2, 2007, 9 pages.

US Patent 7620362, issued Nov. 17, 2009, Office Action, mailed Jul. 18, 2008, 5 pages.

US Patent 7620362, issued Nov. 17, 2009, Office Action, mailed Jan. 8, 2009, 6 pages.

US Patent 7620362, issued Nov. 17, 2009, Notice of Allowance, mailed Jul. 9, 2009, 6 pages.

U.S. Appl. No. 12/056,075, filed Mar. 26, 2008, Michael Wayne Brown, Notice of Allowance, mailed Jun. 6, 2011, 10 pages.

* cited by examiner

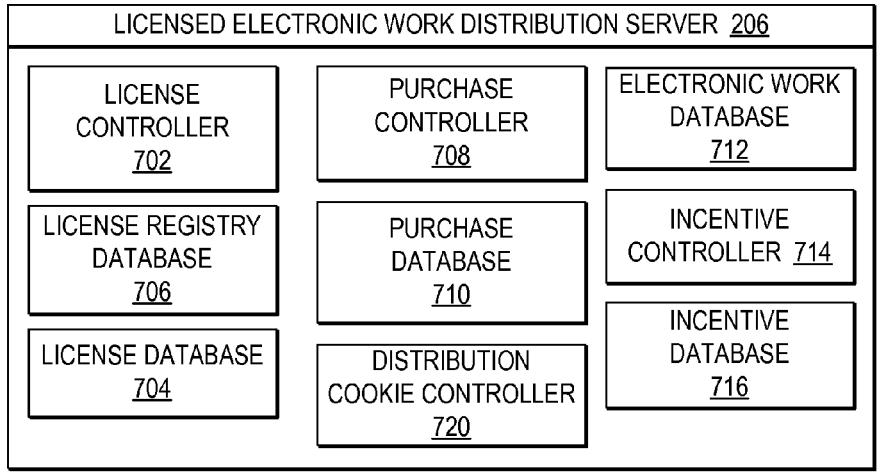
*Fig. 7*
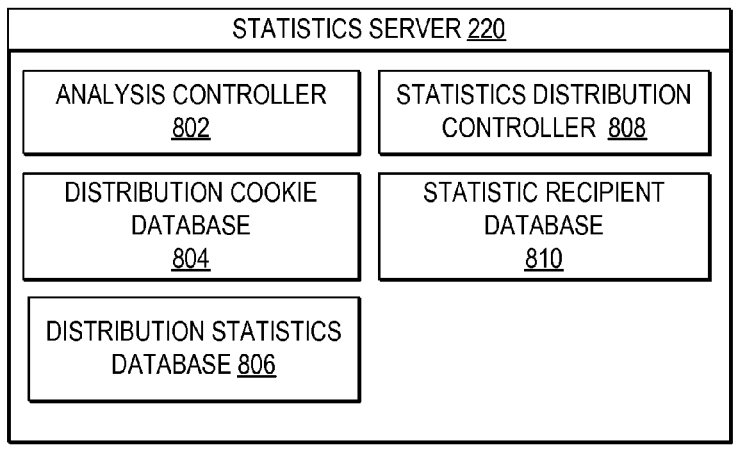
*Fig. 8*
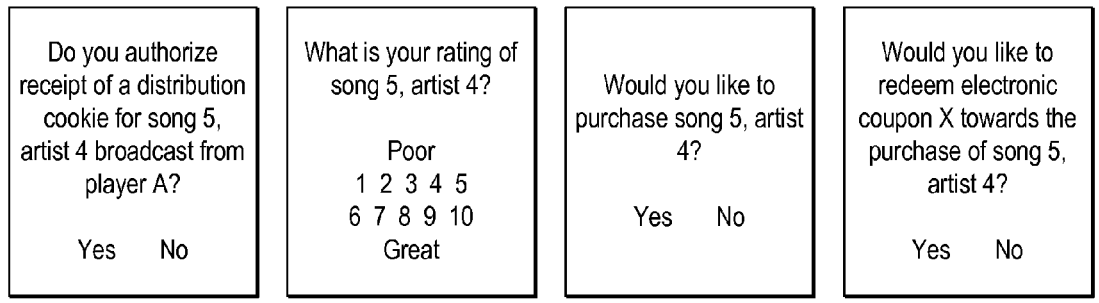
*Fig. 9A*  *Fig. 9B*  *Fig. 9C*  *Fig. 9D*

TRACKING LOCALLY BROADCAST ELECTRONIC WORKS

CROSS-REFERENCE TO RELATED APPLICATIONS

This application is a continuation of commonly assigned U.S. patent application Ser. No. 10/728,161, filed Dec. 4, 2003, which is hereby incorporated herein by reference.

BACKGROUND OF THE INVENTION

1. Technical Field

The present invention relates in general to improved broadcasting systems and in particular to an improved tracking system for locally broadcast electronic works. Still more particularly, the present invention relates to tracking the distribution of an electronic work to determine favorable markets for the electronic work and offer incentives for purchase of the electronic work to those who received the distribution of the electronic work and those who distributed the electronic work.

2. Description of the Related Art

Technological advancements in portable computer systems enable display and audio output of copyrightable works in an electronic form. These electronic works include, but are not limited to, music, film, video, and books. The technological advances, for example, continue to expand the types of electronic devices that play music and video. Further, technological advances are providing new ways of encapsulating music and video and new ways of distributing music and video.

In particular, one of the advances in devices that play electronic works is in portable electronic devices that play music from MPEG-1 Layer 3 (MP3) and other types of electronic compression file formats. MP3 files are typically small in memory size and thus are ideal for storage and play on portable electronic devices. Further, MP3 and other types of electronic formats of licensed works are often easily transferable from one device to another via a wire or wireless network. Further, music files may be streamed from one portable device to another creating a type of ad-hoc radio system.

As sharing of electronic works between users proliferates, users often receive copies of electronic works without the proper licenses. In some cases, recipients do not intended to acquire proper licensing. In other cases, however, recipients acquire copies of electronic works to sample the works and decide if they would like to purchase the work. Thus, it would be advantageous to provide recipients of a broadcast copy of an electronic work with an incentive to purchase proper licensing to the electronic work.

Further, while persuading consumers to purchase properly licensed copies of electronic works is an important goal, also important is selecting markets to promote the author or musician of an electronic work. When copies of electronic works are downloaded from a web site, the number of downloads of the electronic work can be monitored and target markets for promotion of an electronic work may be determined based on the locations of those downloading the electronic work. When an electronic work is locally broadcast from one player to another, however, currently there is no monitoring tool to determine the target market in which an electronic work is considered "hot". For example, if one person downloads a new song and wirelessly broadcasts that song to ten other players that store a copy of the song who then each wirelessly broadcast that song to ten other players and so forth, there is currently no method to monitor that a song has become "hot" in a particular market. Therefore, it would be advantageous to monitor when an electronic work is broadcast and track the location of a broadcast, the time of the broadcast, the recipient's rating of the broadcast electronic work, the recipient's ratings of others' reviews of the broadcast electronic work, and other information which is then accessed by a statistical server when a player is connected to the Internet. Further, it would be advantageous to monitor the distribution path of an electronic work so as to compensate users who essentially promote an electronic work through local broadcasts of the electronic work to other players and well followed reviews of the electronic work It is therefore apparent that there is a need to attach a tracking mechanism to an electronic work, and in particular a locally broadcast electronic work, such that recipients of the electronic work can be tracked, incentives can be offered to the recipients to purchase the electronic work, incentives can be offered to those distributing the electronic work, and statistics about local broadcasts of electronic works may be gathered for promotional purposes.

SUMMARY OF THE INVENTION

In view of the foregoing, the present invention provides improved broadcasting systems. In particular, the present invention provides an improved tracking system for locally broadcast electronic works. Further, the present invention provides a method, system and program for tracking the distribution of an electronic work to determine favorable markets for the electronic work and offer incentives for purchase of the electronic work to those who received the distribution of the electronic work and those who distributed the electronic work.

According to one aspect of the invention, a first player locally broadcasts an electronic work. In one embodiment of the present invention, the local broadcast is a wireless broadcast creating an ad-hoc radio system. A second player receives the localized broadcast of the electronic work and accepts a distribution cookie used for tracking distribution of the electronic work. The second player updates the distribution cookie with information about the broadcast of the electronic work. Then, responsive to detecting a network connection to a statistics server, the second player provides the distribution cookie to the statistics server where localized broadcast distribution of the electronic work is tracked and analyzed.

Along with the electronic work and the distribution cookie, rules for playback of the electronic work may be transferred from the first player to the second player. The rules for playback may require a recipient at the second player to accept the distribution cookie at the second player before allowing playback.

The first player and second player may each operate as a sender and a receiver of wireless broadcasts. Thus, the first player may initially receive the distribution cookie from another player during a broadcast of the electronic work from that other player. Alternatively, the first player may initially receive the distribution cookie from a distribution server that distributes electronic works. The distribution cookie advantageously identifies a distribution path and responses to the electronic works through data including, but not limited to, a distribution server identifier, a purchase identification, a purchaser identification, a time of purchase, a location of purchase, an incentive for distribution of the electronic work, and an incentive for purchase of the electronic work. Thus, when the distribution cookie is passed from the first player to the second player, in addition to updating the distribution path information in the distribution cookie, the second player preferably updates the distribution cookie with a response to the electronic work by a recipient at the second player, wherein a response may include, but is not limited to, a purchase of the electronic work, a rating of the electronic work, a rating of a comment to the electronic work, and a broadcast of the electronic work. In particular, when a distribution cookie is passed from one device to another, a copy of the distribution cookie located on the first player is passed to the second player.

According to another aspect of the invention, the second player, when acting as a receiver, may store the broadcast electronic work and later operate as a sender to broadcast the electronic work and transfer the distribution cookie to another set of players enabled to receive the broadcast electronic work and distribution cookie.

The statistics server receiving the distribution cookie preferably receives distribution cookies from multiple players. The statistics server analyzes the distribution cookies received to track distribution and to determine statistics about the distribution including, but not limited to, a rate of distribution of the electronic work, a marketing area in which the electronic work is favorably received, a purchase rate and history of the electronic work, a current rating response to the electronic work, and a current rating response to at least one comment about the electronic work.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a block diagram of the components of a licensed electronic work distribution server in accordance with the method, system, and program of the present invention;

FIG. 8 is a block diagram of a statistics server in accordance with the method, system, and program of the present invention;

FIGS. 9A-9D are illustrative representations of display choices presented to a user of a player enabled to receive, store, and broadcast electronic works in accordance with the method, system, and program of the present invention;

DETAILED DESCRIPTION OF THE PREFERRED EMBODIMENT

Figure 1:
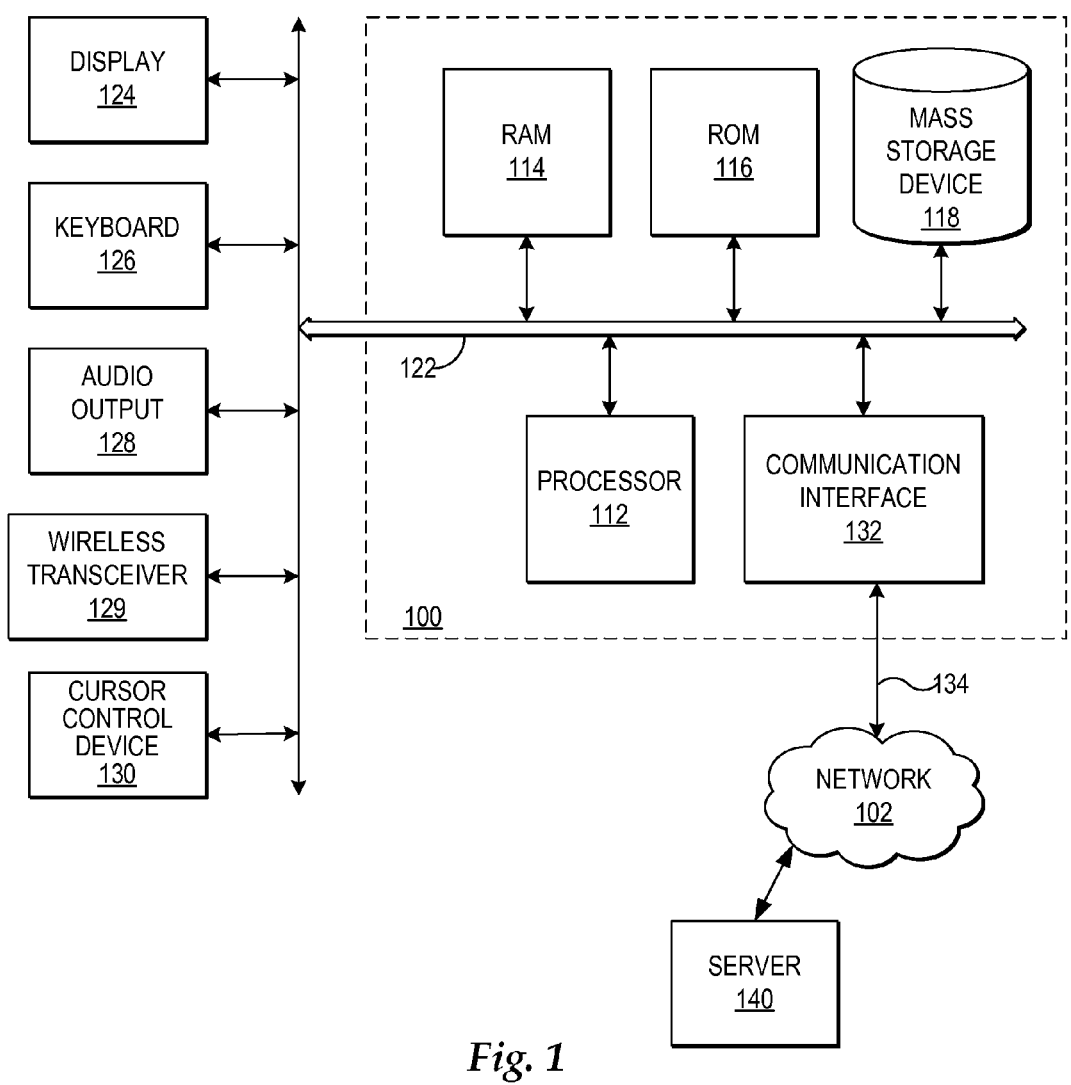
FIG. 1 is a block diagram depicting a computing system in which the present method, system, and program may be implemented.

Referring now to the drawings and in particular to FIG. 1, there is depicted one embodiment of a computing system in which the present method, system, and program may be implemented. The present invention may be executed in a variety of systems, including a variety of computing systems and electronic devices under a number of different operating systems. In general, the present invention is executed in a computer system or electronic device that performs computing tasks such as manipulating data in storage that is accessible to the computer system or electronic device. In addition, the computer system includes at least one output device and at least one input device.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 11, 12, 13, 14, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102.

Network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Further, multiple peripheral components may be added to computer system 100, connected to multiple controllers, adapters, and expansion slots coupled to one of the multiple levels of bus 122. When implemented as a portable player, for example, a wireless transceiver 129 may be connectively enabled on bus 122 for controlling wireless transmissions. Wireless transceiver 129 constantly listens to a pre-programmed public channel for new, remote parties and sends and receives data and messages on the public channel. Wireless transceiver 129 may be implemented by any short-range radio technology, such as, but not limited to, Bluetooth, 802.11, or Digital Enhanced Cordless Telecommunications (DECT). An audio output 128 is connectively enabled on bus 122 for controlling audio output through a speaker, headphones, or other audio projection device. A display 124 is also connectively enabled on bus 122 for providing visual, tactile or other graphical representation formats. A keyboard 126 and cursor control device 130, such as a mouse, trackball, or cursor direction keys, are connectively enabled on bus 122 as interfaces for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

The functionality of computer system 100 may be implemented in data processing systems from servers to portable players. Portable players may be computer systems that are tailored to efficiently receive, store and playback electronic works. Examples of portable players include, but are not limited to, MP3 players, portable DVD players, electronic book (ebook) play devices, and other devices specified for playback of a particular type of electronic work. Portable players may also be incorporated into other types of portable computer systems, such as wireless telephones and personal digital assistants.

Figure 2:
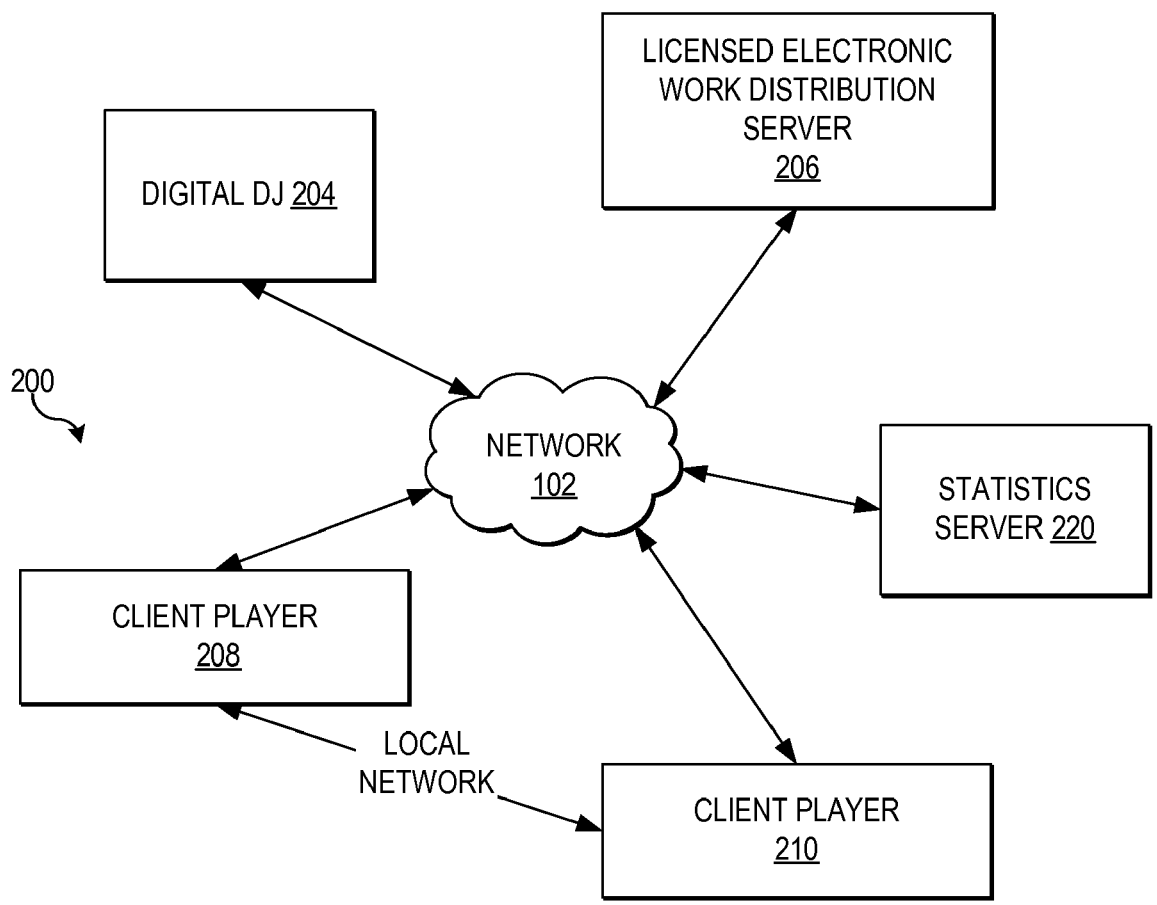
FIG. 2 is a block diagram depicting a distributed network system for facilitating an electronic work licensing, distribution, and tracking system in accordance with the method, system, and program of the present invention.

With reference now to FIG. 2, a block diagram depicts a distributed network system for facilitating an electronic work licensing, distribution, and tracking system in accordance with the method, system, and program of the present invention. Distributed system 200 is a network of computers in which the present invention may be implemented. Distributed system 200 contains a network 102, which is the medium used to provide communications links between various devices and computers connected together within distributed system 200. Network 102 may include permanent connections such as wire or fiber optics cables, temporary connections made through telephone connections, and wireless transmission connections.

The client/server environment of distributed system 200 includes multiple client players 208 and 210 communicatively connected to network 102. In addition, there are multiple servers, such as digital DJ server 204 and licensed electronic work distribution server 206 communicatively connected to network 102.

The client/server environment of distributed system 200 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client players 208 and 210 and render Web documents (pages) served by a web server, such as servers 204, 205, and 206. Additionally, each of client players 208 and 210 and servers 204, 205, and 206 may function as both a "client" and a "server" and may be implemented utilizing a computer system such as computer system 100 of FIG. 1. Further, the present invention is also implemented by client players 208 and 210 engaged in peer-to-peer network communications and downloading via network 102.

The Web may refer to the total set of interlinked hypertext documents residing on servers all around the world. Network 102, such as the Internet, provides an infrastructure for transmitting these hypertext documents between systems connected to network 102. Documents (pages) on the Web may be written in multiple languages, such as Hypertext Markup Language (HTML) or Extensible Markup Language (XML), and identified by Uniform Resource Locators (URLs) that specify the particular web page server from among servers, such as server 205, and pathname by which a file can be accessed, and then transmitted from the particular web page server to an end user utilizing a protocol such as Hypertext Transfer Protocol (HTTP) or file-transfer protocol (FTP). Web pages may further include text, graphic images, movie files, electronic books, sound files, and streaming audio, as well as Java applets and other small embedded software programs that execute when the user activates them by clicking on a link.

While network 102 is described with reference to the Internet, network 102 may also operate within an intranet or other available networks, including peer to peer networks. Furthermore, client players 208 and 210 may connect to network 102 through a data processing system acting as a port for transferring information between servers accessible through network 102 and client players 208 and 210. Additionally, preferably, client players 208 and 210 may communicate within a local wireless network, as will be further described in FIG. 3. This local wireless network is typically considered "ad-hoc" because it is created when client players 208 and 210 are within wireless broadcast range of one another.

Client players 208 and 210 are computer systems enabled to receive, play, and store electronic works from one another through local wireless broadcasts. In particular, the DRM rules attached to an electronic work received at each of client players 208 and 210 may control the play and storage of the electronic work. The DRM rules may require a recipient to first agree to receive a distribution cookie before client player 208 or 210 can playback or store the electronic work. The distribution cookie preferably tracks the distribution of an electronic work and the recipient's responses to the electronic work. Client players 208 and 210 are required to update the distribution cookie according to the data values specified in the DRM rules. Then, when either of client players 208 or 210 connects to network 102, the DRM rules trigger the players to contact a particular location accessible via network 102, such that the network location is enabled to access the distribution cookie. In the example, distribution cookies are accessed by statistics server 220, however in alternate embodiments, other locations accessible from network 102 may be triggered to access distribution cookies.

Further, as described, client players 208 and 210 are portable and enabled to receive and send wireless transmissions within a local wireless network range. In alternate embodiments, however, either of client players 208 and 210 may be considered stationary.

Multiple ranges of wireless transmission capability may be implemented within a single client player. For example, Bluetooth, which is a short range wireless technology and 802.11, which is a mid-range wireless technology, may be implemented within a single client player to enable multiple ranges of wireless transmissions. In particular, the DRM rules attached to an electronic work may specify the preferred reception and transmission ranges for broadcast of an electronic work and the DRM rules may limit the type of network available for broadcast of an electronic work. For example, DRM rules may specify that electronic works are transmittable by cable only, by Bluetooth only, or by a peer to peer network allowing a set number of concurrent connections. It is important to note that while the present invention is described with emphasis upon wirelessly broadcast electronic works, electronic works may also be locally broadcast via a cabled network connection from client player 208 and client player 210. A local broadcast is one that is accessible to players located within a particular physical area or network area.

Digital DJ server 204 provides a service for selecting electronic works for play between client players 208 and 210. Digital DJ server 204 may track the previous ratings of electronic works made by recipients at client players 208 and 210. According to one embodiment, digital DJ 204 may access distribution cookies to track the previous ratings of electronic works. Further, digital DJ 204 may access the statistical analysis of distribution cookies from statistics server 220 to determine which electronic work to play next from the electronic works currently considered "hot" based on their rates of distribution in a particular area. Then, digital DJ server 204 may determine which electronic work to play next from the electronic works that currently reside on client player 208 or 210. Alternatively, digital DJ server 204 may determine which electronic work to play next from electronic works currently residing at digital DJ server 204. The functionality of digital DJ server 204 may also reside within client players 208 and 210.

Licensed electronic work distribution server 206 provides a service for selling electronic works with licenses in the form of attached DRM rules. Further, licensed electronic work distribution server 206 provides a service for tracking licenses and use of licensed electronic works. A user may be required to register an identity or make a payment to acquire an electronic work and license or just the license to an already stored electronic work. According to one embodiment, a user may be provided an incentive to register an identity with the purchase of an electronic work because the user's distribution of the electronic work will be tracked and the user will be given coupons or rebates for subsequent purchases. The type of coupons and rebates received by the user may be adjusted based on how many purchases are made by those receiving the broadcast of the electronic work from the user. Where a user samples an incomplete version of an electronic work from a wireless broadcast, the DRM rules may include a link to licensed electronic work distribution server 206 to acquire a complete version of the electronic work.

Licenses are preferably attached to electronic works in the form of DRM rules. These DRM rules may allow a user who has purchased an electronic work to wirelessly transmit a sample of that electronic work to other electronic devices. For example, a song purchased by the user of client player 208 may include DRM rules that allow for broadcast of the song to client player 210. Additionally, the DRM rules preferably limit the allowed usage of the sample of electronic work and are thus transmitted with the broadcast of the electronic work. Where, however, DRM rules or other licensing rules are not attached to an electronic work received at client player 208 or 210, the client player may initiate a request for acquiring licensing to the electronic work with licensed electronic work distribution server 206 before the electronic work can be played.

In addition to transferring DRM rules with each electronic work, other information is transferred. In particular, a distribution cookie is attached to each electronic work as a tracking mechanism. Table 1 illustrates examples of the types of entries that may be included in a distribution cookie. Preferably, the distribution cookie initially includes the name of the distributor, an identifier for the purchase, and an identifier for the purchaser of the electronic work from a licensed distributor. As the electronic work is broadcast from player to player, each player receives a copy of the distribution cookie which is then updated with an identifier for the recipient, the broadcast time, the broadcast location, any rating responses, and any purchase history. The location of the recipient may be detected, for example, by a GPS function of the player or area code of telephone recipient at the player. Further, the location of the recipient may be detected by prompting the recipient to enter a zip code location in order to play the broadcast electronic work at the player.

TABLE 1

| | |
|---|---|
| Electronic work ID | 200000001 |
| Distributor | www.distributor1.com |
| Purchase ID | 01010101 |
| Purchaser ID | George Smith |
| Counter | 1 |
| Broadcast recipient | Donald Smith |
| Broadcast time | Oct. 24, 2004; 10:10:30 |
| Broadcast location | Austin, Texas |
| Rating | 3 of 10 |
| Rating of comment 2 | 1 of 10 |
| Counter | 2 |
| Broadcast recipient | Susan Smith |
| Broadcast time | Oct. 24, 2004; 15:10:30 |
| Broadcast location | Austin, Texas |
| Purchase location | www.musicseller1.com |
| Purchase history | Oct. 24, 2004 |
| Counter | 3 |

When client player 208 or 210, having received a broadcast of an electronic work with a distribution cookie from another player, connects to network 102, a statistics server 220 preferably gathers the distribution cookie from the player. Statistics server 220 may be a single server system that tracks all electronic work statistics and distributes these statistics. Alternatively, each distributor may establish a statistics server 220 or other server location at which distribution cookies are gathered when players are connected to the network 102 or another network.

As will be further described with reference to FIG. 8, statistics server 220 preferably includes multiple databases and controllers enabled to store and analyze information retrieved from distribution cookies. In addition to gathering the distribution rates and locations of electronic works, statistics server 220 may also gather the rating each recipient gave to an electronic work and the rating each recipient gave to review comments attached to an electronic work. It will be understood that any response a recipient of an electronic work has to the electronic work may be recorded in the distribution cookie for the electronic work.

It is important to note that while distribution cookies are described as passing from one device to another and passing to servers, it is understood that a copy of the distribution cookie file located at one player may be passed to another player or server. Additionally, it will be understood that while a traditional cookie is merely a data file readable by a server, distribution cookies may include a triggering device that initiates communication with the server when a network connection is detected. Alternatively, client player 208 or 210 may automatically trigger communication with a network location specified in a distribution cookie when a network connection is detected.

As illustrated in Table 2, information gathered from distribution cookies is organized in a database structure. Table 2 illustrates an example of information for several of the distribution cookies returned from the distribution of electronic work "20000001". It will be understood that alternate types of identifiers may be used for an electronic work. In the example, two distribution cookies are logged from region A and one distribution cookie is logged from region B. The distribution rate logged from each distribution cookie is based on the number of times the electronic work was distributed from an initial player to the player returning the cookie when the player returning the cookie received the electronic work. It will be understood that other values may be logged to indicate a distribution rate. For example, the distribution rate may be broken down into times of day of broadcasts and the type of network connection used for each broadcast.

Advantageously, based on the distribution rate, statistics server 220 may designate a particular electronic work as "hot" in a particular region or "cold" in a particular region. For example, statistics server 220 may assign a hot rating that indicates the increase in activity for the electronic work in a particular region based on the information gathered for the distribution cookie. In the example, the hot rating is a positive or negative number based on the speed of distribution within a region. In alternate embodiments, other types of hot rating systems may be implemented to indicate which electronic works are quickly being distributed in a particular region. Further, in alternate embodiments, the hot rating may be based on both the distribution rate and the actual rating given to the electronic work by each of the recipients. Additionally, in alternate embodiments, in addition to indicating whether a particular electronic work is hot or not in a particular region, it may be determined that the time or point of distribution was "off" because the work was poorly received at a first time or point of distribution and later well received by the same recipients at second time or location. Moreover, while in the present invention a server system accesses distribution cookies via network 102 and performs analysis that is then distributed to other system, in an alternate embodiment, one of client players 208 or 210 may access distribution cookies and perform analysis that is then used to select the next electronic work to play.

TABLE 2

| Work | Region | Distribution Rate | Hot Rating |
|---|---|---|---|
| 20000001 | A | 30 in 10 minutes | +5 |
| 20000001 | A | 5 in 30 minutes | +1 |
| 20000001 | B | 1 in 40 minutes | −1 |

Table 3 depicts an example of analysis of several distribution cookies designating the identifier for the original player of an electronic work and the purchases associated with the distribution. Advantageously, the distribution cookie tracks any purchases made of the broadcast electronic work. The distribution cookie then indicates the original purchaser identifier, the new purchaser identifier, the purchase date, the number of times the work was distributed before it reached the purchaser, and other important information about the purchase. Based on this distribution information, an original purchaser may receive a rebate or other incentive to reward the original purchaser for distributing the electronic work to others who then purchased the electronic work.

TABLE 3

| Work | Orig. ID | Purchaser ID | Purchase Date | Dist Path |
|---|---|---|---|---|
| 20000001 | George Smith | Susan Smith | Oct. 24, 2004 | 3 |
| 20000001 | George Smith | Sally James | Oct. 30, 2004 | 20 |
| 20000001 | George Smith | Tim Jones | Nov. 18, 2004 | 2 |

Table 4 illustrates an example of analysis of ratings of reviewer comments made by recipients of a broadcast electronic work. Preferably, in addition to broadcasting the electronic work, reviewer comments about the electronic work may be transferred. Reviewer comments may include comments by independent reviewers attached at the purchase of the electronic work and comments made by recipients of the electronic work as it is broadcast from one player to another.

Preferably, recipients of the electronic work are enabled to view or listen to the reviewer comments and may rate the comments. Thus, Table 4 shows the combined ratings for a particular reviewer of a particular work by recipients of the broadcast of the electronic work. A hot rating for the particular reviewer may be assigned by statistics server 220 dependent upon the ratings provided by recipients of the broadcast of the electronic work. The hot rating represents a reviewer recommendation depth which equals the number of positive reviews in a distribution chain over a particular period of time. Licensed electronic work distribution server 206, for example, may use the reviewer hot rating to decide to attach review comments by a reviewer with a good hot rating to new purchases of an electronic work and decide to detach review comments by a reviewer with a poor hot rating from new purchases of an electronic work.

TABLE 4

| Work | Recipient ID | Reviewer ID | Rating | Hot Rating |
|---|---|---|---|---|
| 20000001 | 03030303 | 0423 | 1 star | −2 |
| 20000001 | 05050505 | 0423 | 5 star | 3 |

In an example of the analysis of distribution cookies and response to the analysis, first a distributor receives a copy of a new song with DRM rules allowing full time or temporary wireless broadcast of the song. The first distributor may optionally review the work, where the review is added to the distribution cookie for the song with an identifier for the user. Further, a rating of the first distributor's previous reviews may be added to the distribution cookie with the current review of the new song. The first distributor wirelessly broadcasts the new song to other known top distributors who subsequently wirelessly broadcast the new song to others. With each distribution of the song, identifiers for the sender and the recipient are preferably updated in the distribution cookie also distributed with the new song. Further, with each distribution of the song, recipients preferably rate the song and rate the review written by the first distributor and other recipients. When distribution cookies are gathered for the new song, then the markets in which the song was quickly distributed and highly rated can be determined and returned to the original supplier. Further, the reviews distributed with the new song that were the most well received and influential can be determined and returned to the original supplier. The original supplier may then distribute payments or electronic coupons to the distributors of the new song based on the purchases made by recipients due to trackable responses to a review, quality of review ratings, time to distribution, bulk quantity of users reached, and other criteria.

In another example of the analysis of distribution cookies and response to the analysis, statistics server 220 may monitor the number of electronic works that a recipient has rated. Recipients may be given an electronic coupon or other incentive to rate a certain number of songs. For example, after the recipient of wirelessly broadcast song rates forty songs, the recipient may be provided with a limited licensed sample of an electronic work that is anticipated to meet the preferences of the recipient based on the prior ratings. Additionally, a playlist of song for that recipient may be specified by digital DJ server 204 and distributed to players within broadcast range of the recipient or the recipient.

Figure 3:
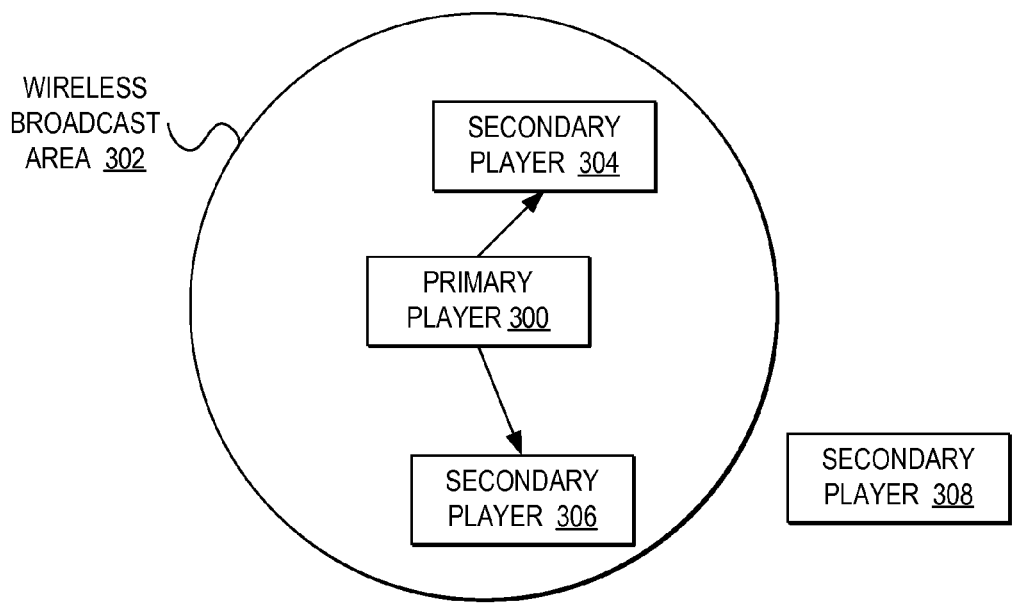
FIG. 3 is a block diagram depicting a wireless network broadcast in accordance with the method, system, and program of the present invention.

Referring now to FIG. 3, there is depicted a block diagram of a local wireless network broadcast in accordance with the method, system, and program of the present invention. As illustrated, of the client players illustrated in FIG. 2, one of these players may be designated as a primary player, such as primary player 300, for the local wireless network. Players may vie for the designation as primary player by offering electronic works or one player may automatically be designated as primary player. Further, after one player receives a wireless broadcast of an electronic work, the player may move to a new broadcast area and become the primary player for that electronic work in the new broadcast area. It is important to note that while a wireless network of players is described, in an alternate embodiment, players may also be connected via a cable or a wired network connection.

In one example, primary player 300 searches for secondary players enabled to wirelessly communicate. Primary player 300 is enabled to wirelessly communicate within a range designated by wireless broadcast area 302. Once primary player 300 detects other players, such as secondary players 304 and 306, within wireless broadcast area 302, primary player 300 may establish a local wireless network. Within the local wireless network, primary player 300 may wirelessly stream the electronic work being played on primary player 300 as a sample electronic work. Preferably, the DRM rules and context associated with the streamed electronic work are also broadcast. Additionally, a distribution cookie is preferably streamed with the electronic work. It is important to note that primary player 300 is depicted as a sender in the example, however, in alternate embodiments, primary player 300 may be a recipient when receiving a wireless broadcast of an electronic work. In addition, it is important to note that secondary players 304 and 306 are depicted as recipients in the example, however, in alternate embodiments, secondary players 304 and 306 may be a senders when broadcasting an electronic work.

An advantage to streaming the electronic work as it is playing on primary player 300 is that synchronous play is possible on secondary players 304 and 306. However, in addition to streaming an electronic work as it plays, the entire sample electronic work may be wirelessly transmitted as a data file from primary player 300 to secondary players 304 and 306.

In an alternate example, primary player 300 is constantly broadcasting a stream within wireless broadcast area 302 of the current electronic work playing on primary player 300. When players, such as secondary players 304 and 306 are within the wireless network area, then the broadcast stream is received at the secondary players. For example, primary player 300 may be a stationary player that wirelessly broadcasts within a store or other defined area to secondary players that enter the store or other defined area. In another example, primary player 300 may be a portable player that wirelessly broadcasts from its current location, thus creating an ad-hoc local wireless network area as it moves.

The broadcast of an electronic work by primary player 300 may be controlled by the DRM rules attached to the electronic work being broadcast. In particular, the DRM rules may specify preferences or limitations for the reception and transmission ranges and the transmission mediums. Preferably, wireless and cabled feedback systems are included in primary player 300 and secondary players 304 and 306 to facilitate range detection.

According to one advantage of the present invention, the DRM rules may require a recipient of a broadcast to receive a distribution cookie with the broadcast of the electronic work. The distribution cookie then tracks information about the distribution of the electronic work and responses of recipients of the electronic work.

The context of an electronic work broadcast by primary player 300 may also be transmitted with the electronic work. The context of the electronic work generally includes the history, reviews, and distribution path of an electronic work. For example, for a musical work, the context may include, but is not limited to, a song title, artist name(s), genre, album name, album type, distributor name, distributor link, label name, label link, artist link, reviewer name, reviewer ratings, reviewer text, and the reviewer recommendation depth. DRM rules may control what portions of the context of an electronic work may be broadcast.

Secondary players 304 and 306 receive the streamed electronic work and may synchronously play back the electronic work. Additionally, secondary players 304 and 306 may store a copy of the broadcast stream with the DRM rules for later playback. Once secondary players 304 and 306 move out of broadcast area 302, such as the position of secondary player 308, then only the stored copy of the broadcast stream can be played back as allowed by the DRM rules.

Prior to broadcasting an electronic work, primary player 300 may query secondary players 304 and 306 for user preferences. Primary player 300 may then determine which electronic works stored on primary player 300 should next be played based on the user preferences from secondary players 304 and 306 and the user preferences for primary player 300. Alternatively, primary player 300 may transmit all the relevant user preferences to a digital DJ via an Internet connection and request recommendations for the next broadcast from the current electronic works accessible from primary player 300 or any of the secondary players. Further, the digital DJ may recommend new electronic works and negotiate payment with primary player 300 for the work from a licensed electronic work distribution server.

Once a user listens to or views a streamed electronic work at secondary player 304 or 306, the user preferably rates the electronic work. A rating may take multiple forms including, but not limited to, a thumbs up/down, a numeral rating, an alphanumeric rating, or other selection from a rating system implemented by the players. Additionally, a user may review the electronic work. Review comments and the identity of the reviewer may be added to the context of the electronic work and transmitted among the other players and broadcast with the electronic work. Advantageously, the user rating of an electronic work and the user rating of the review comments may also be updated in a distribution cookie associated with the electronic work.

If the secondary player, such as secondary player 304, is still within broadcast range of primary player 300 when the user rates the streamed electronic work, then secondary player 304 preferably transmits the rating of the broadcast electronic work to primary player 300. Primary player 300 may then use the rating to dynamically adjust the next selected electronic work for broadcast.

Figure 4:
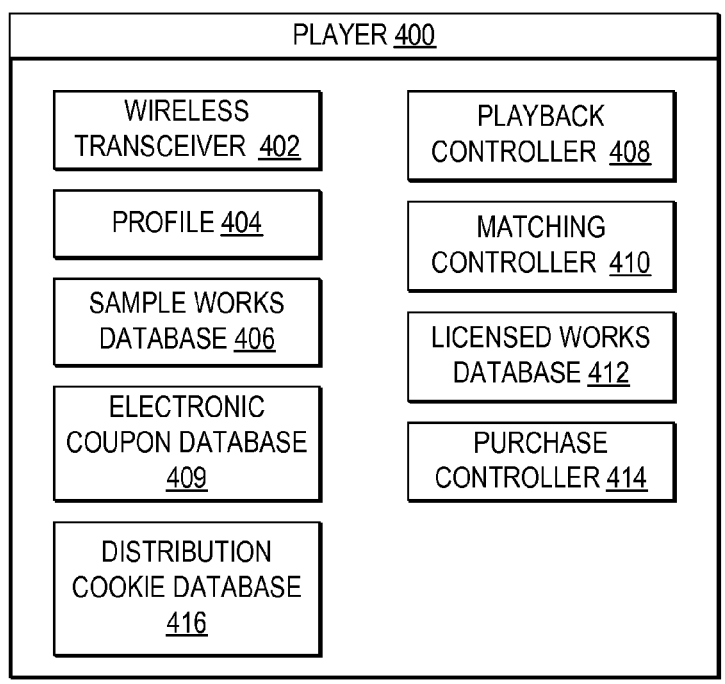
FIG. 4 is a block diagram depicting a music player in accordance with the method, system, and program of the present invention.

With reference now to FIG. 4, there is illustrated a block diagram of a music player in accordance with the method, system, and program of the present invention. As illustrated, player 400 includes an example of components that may operate within an electronic device enabled to receive, play, and store electronic works.

First, player 400 includes a wireless transceiver 402 enabled to send and receive wireless communications. Wireless transceiver 402 may implement multiple types of wireless broadcast technology including, but not limited to, Bluetooth, 802.11, and DECT.

Next, player 400 includes a playback controller 408 enabled to synchronize playback of a data stream with the other players playing the same data stream of an electronic work. As long as player 400 is within the broadcast range of the primary player, playback controller 408 may enable playback of a current data stream of an electronic work or playback of a previously stored sample electronic work received from the primary player.

Playback controller 408 also preferably condenses and stores data streams of electronic works in a sample works database 406. Sample works database 406 includes condensed files, in formats such as MP3, from streaming electronic works with DRM rules and context. When player 400 is outside the broadcast range of the primary player, then the stored sample electronic works in sample works database 406 may be played back, but only according to DRM rules for each electronic work. Further, playback controller 408 may prohibit playback of any electronic work sample acquired without any licensing rights.

Playback controller 408 also controls playback of electronic works downloaded onto player 400 with a license for personal use and potentially also for broadcast to other players. In particular, electronic works may be downloaded that include a license to transfer the electronic work file or broadcast the electronic work to other players as a sample electronic work with DRM rules limiting playback of the sample work.

When electronic works are streamed from one player to another, electronic coupons may also be broadcast. Electronic coupons received at player 400 are stored in electronic coupon database 409. Electronic coupons may include discounts, rebates, and other incentives for a recipient of a broadcast electronic work to purchase the electronic work or purchase additional licensing rights to the electronic work from a licensed electronic work distribution server. Electronic coupons may be incorporated in a distribution cookie or may be independent files.

Additionally, when electronic works are streamed from one player to another, distribution cookies may also be broadcast. Further, when licensing rights to an electronic work are acquired, a distribution cookie may be attached to the electronic work. Distribution cookies received at player 400 are preferably stored in distribution cookie database 416. When player 400 detects a network connection with a network enabling access to a statistics server, then recently updated distribution cookies in distribution cookie database 416 are preferably made accessible to the statistics server and other specified network locations.

A profile 404 stored on player 400 preferably records the electronic work preferences for a user. Profile 404 may include, but is not limited to, a listing of the current electronic works stored on player 400 and ratings assigned by the user to each of the electronic works stored on player 400. Additionally, profile 404 may include, but is not limited to, a listing of electronic works previously listened to or viewed by the user and the rating assigned by the user to each. Further, profile 404 may include, but is not limited to, a listing of styles of music, film, books, musicians, actors, years of recording, and other categories of preferences for a user. Moreover, profile 404 may include, but is not limited to, a listing of types of music, film, artists, actors, songs, and years of recording that a user would like to listen to or view in the future. Advantageously, a distribution cookie may be updated with the information stored in profile 404 before the distribution cookie is transmitted to a statistics server.

Player 400 can transfer the data in profile 404 to other players within a local wireless network. Further, player 400 may receive profiles from other players within a local wireless network. A matching controller 410 within player 400 compares the profiles of other users within the local wireless network with the context of the electronic works available for broadcast in licensed works database 412 and selects music for broadcast to the other players that best satisfies the preferences of all the listeners. If the preferences of some users cannot be matched with the preferences of other users, then matching controller 410 may alternate selections between those that will satisfy the preferences of a first group of users and then those that will satisfy the preferences of a second group of users. Alternatively, if a preference match cannot be made to the current electronic works, then player 400 may seek to acquire new electronic works that will match preferences.

As an additional advantage, once other users listen to or view an electronic work broadcast from player 400, ratings by the recipient users may be transmitted back to player 400. Matching controller 410 may then dynamically adjust the next electronic work to be broadcast from player 400 based on the reported rating for the recently broadcast electronic work.

Further, when a wirelessly broadcast work is received at player 400, a user is prompted to rate the electronic work. The rating is then stored in profile 404, updated in a distribution cookie, and transmitted to the player from which the electronic work was received. Thus, user preferences dynamically change for each electronic work viewed or listened to by a user.

A purchase controller 414 preferably initiates access via an Internet or other network connection to a licensed electronic work distribution server to acquire additional licensing and to register stored samples of electronic works from broadcasts. A particular licensed electronic work distribution server may be specified for purchases in the DRM rules transferred with an electronic work.

In particular, for each rating entered by a user in response to listening or viewing a work at player 400, purchase controller 414 determines if there is a DRM rule for the electronic work specifying when a user should be prompted to purchase an electronic work. If there is a rule requiring prompting upon detection of a network connection, then purchase controller 414 triggers the prompting upon detection of a network connection to an electronic work license server or a licensed electronic work distribution server. For example, a DRM rule may specify that a user should be prompted to purchase an electronic work only if the user rates the work with a thumbs up. In this way, a distributor can distribute a work, but only prompt purchases from those who have received the work and given a favorable rating. Further, the DRM rule may require that those who give a sample work a favorable rating be required to purchase the additional licensing rights to the work for further playback.

Figure 5:
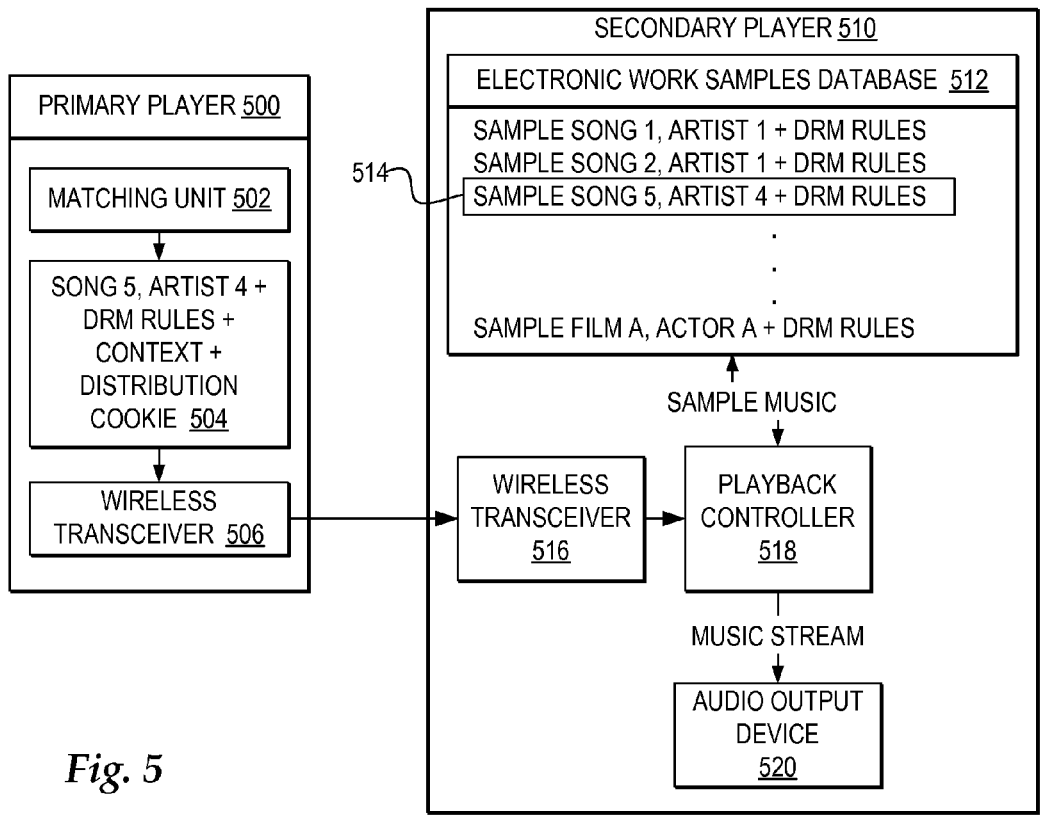
FIG. 5 is a block diagram depicting the wireless communication between a primary player broadcasting music and the secondary player receiving music in accordance with the method, system, and program of the present invention.

Referring now to FIG. 5, there is depicted a block diagram of the wireless communication between a primary player broadcasting music and the secondary player receiving music in accordance with the method, system, and program of the present invention. As illustrated, a primary player 500 includes a matching unit 502 that selects song 5 from artist 4 with DRM rules, context, and a distribution cookie, as depicted at reference numeral 504. When matching unit 502 selects an electronic work, the context data for the electronic work and DRM rules are matched with a selection of user preferences from the user of the primary player and the users of any accessible secondary players. Context data for an electronic work may include, but is not limited to, song title, artist name(s), genre, album name, album types (e.g. original LP or compilation), reviewer name, reviewer ratings, reviewer text, reviewer recommendation depth. DRM rules may include, for example, whether the electronic work is free or is ruled by a limited license.

In this embodiment, the musical work is streamed through wireless transceiver 506 and received at wireless transceiver 516 of secondary player 510. Secondary player 510 includes a playback controller 518 that synchronizes playback of the music stream with primary player 500 and controls output of the stream through audio output device 520. The music stream is also stored as sample music by music playback controller 518 in an electronic work samples database 512. As illustrated at reference numeral 514, the sample of song 5, artist 4 with DRM rules is stored in electronic work samples database 512. Although not depicted, the context is also stored in electronic work samples database 512 and the distribution cookies are preferably stored in a distribution cookie database. While the present invention is described where DRM rules and context are transmitted in a wireless broadcast of a work, in an alternate embodiment, only the electronic work is transmitted in a wireless broadcast of a work.

Figure 6:
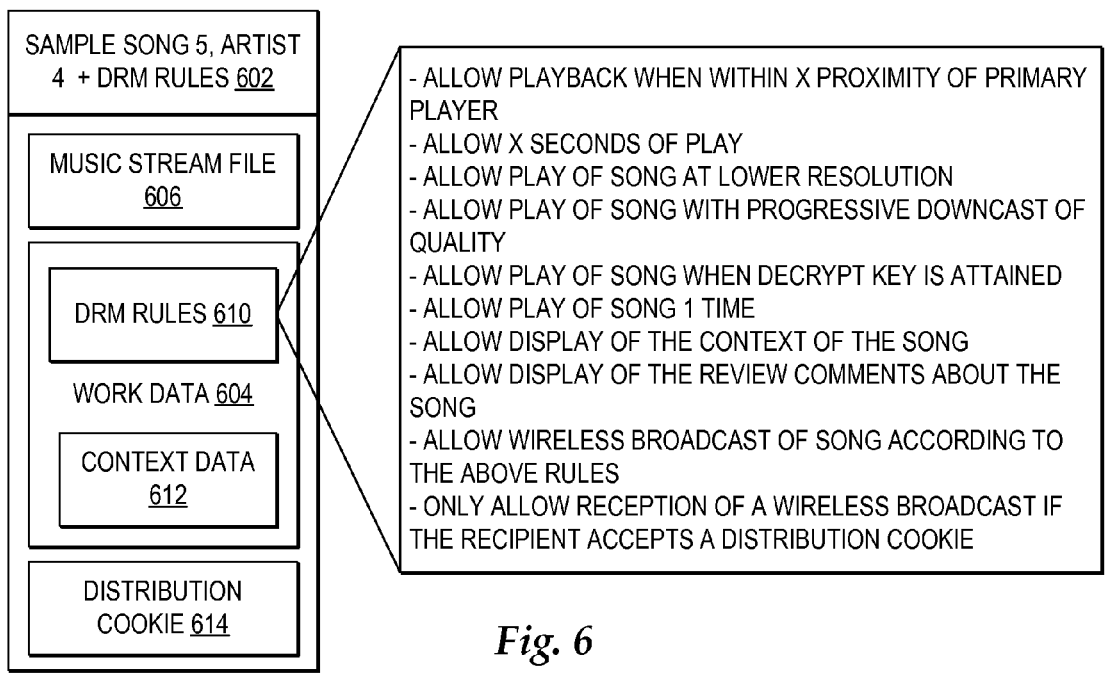
FIG. 6 is a block diagram depicting a sample song stored in a music player in accordance with the method, system, and program of the present invention.

With reference now to FIG. 6, there is depicted a block diagram of a sample musical work stored in a secondary player in accordance with the method, system, and program of the present invention. As illustrated, the storage of an electronic work, here song 5 from artist 4, may include work info 604, a music stream file 606, and a distribution cookie 614.

Work info 604 includes DRM rules 610 and context data 612. DRM rules 610 preferably control play of the electronic work and output of the context of the electronic work. Context data 612 preferably includes historical context, distribution context, and review context for the electronic work.

In the examples of DRM rules 610, playback of a song stored at a music player may be allowed when the player is within a certain transmission range of the primary player. Proximity to the primary player may be measured by the signal strength detected from the primary player.

In another example of DRM rules 610, the song stored at a player may be played back, but only a certain number of seconds of the song or a lower resolution or downcast in quality may be allowed. Further, in another example, the entire song may be stored, but the digital rules may require a decrypt key be accessed from a licensing database before the song can be played. In particular, rather than storing the music stream, the music file may be transferred and stored where the decrypt key is required for later play. Further, DRM rules 610 may allow playback of the entire song In addition to playback of the song, DRM rules 610 may restrict what portions of context data 612 can be viewed where the context includes, but is not limited to, song title, album title, composer, writer, singer, producer, label, year of recording, genre, album type (e.g. original LP or compilation), reviewer name, reviewer ratings, reviewer text, reviewer recommendation depth. Additionally, DRM rules 610 may restrict what review comments the user can view about the song. Review comments may be included in the streamed transmission from multiple music reviewers or from other users who have rated the song. DRM rules 610 may require that the text or audio review play prior to, during, or after the electronic work. Advantageously, each user receiving an electronic work may update context data 612 with ratings and review comments. Further, when a user specifies ratings and review comments to update context data 610, the user may further specify DRM rules for play or display of the rating and review comments.

Additionally, DRM rules 610 may restrict whether a song may be wirelessly broadcast to other players. In the example, wireless broadcast is allowed with the restrictions established by the other DRM rules. Additionally, DRM rules 610 require the recipient of the wireless broadcast to accept a distribution cookie before playback of the broadcast electronic work is allowed.

Context data 612 also preferably identifies the manufacturer, producer, and distributor and provides contact information for making purchases. Additionally, the music playback controller preferably adds an identifier for each recipient who receives a broadcast of an electronic work to context data 612, such that the distribution flow of an electronic work is tracked. Preferably, a music playback controller within a music player restricts play of music or other electronic works and display of context data on the player according to the DRM rules.

Distribution cookie 614, as described in Tables 1-4, preferably includes the distribution history of electronic work 602 and recipient responses to electronic work 602. With each wireless broadcast of electronic work 602, the distribution history within distribution cookie 614 may be updated. In addition to the information described in Table 1, distribution cookie 614 may include an electronic coupon specified by the distributor and redeemable according to DRM rules 610.

In an alternate embodiment, the playback controller in a player may require acquisition of DRM rules for a sample electronic work from a licensing server prior to playing the electronic work. Further, where music and other electronic works are received without DRM rules, the playback controller may automatically initiate requests for ratings, offers to purchase, and other promptings that might otherwise be filtered by DRM rules. Furthermore, where a distribution cookie is not received with an electronic work, the playback controller may create a distribution cookie based on the available distribution history and recipient responses.

With reference now to FIG. 7, there is illustrated a block diagram of the components of a licensed electronic work distribution server in accordance with the method, system, and program of the present invention. As illustrated, licensed electronic work distribution server 206 includes a license controller 702. License controller 702 receives requests to acquire licenses for music. Further, license controller 702 may receive requests to verify a music license from players receiving broadcast electronic works. Preferably, a license database 704 stores licenses for electronic works and a license registry database 706 stores user identifiers for those who acquire music licenses. In particular, if the user meets the requirements of the license, such as paying a fee or registering, then a license for the electronic work may be transferred. In an alternate embodiment, licensed electronic work distribution server 206 controls licenses for all types of electronic works. As previously described, multiple types of licenses may be implemented with restrictions on use. The actual restrictions are preferably defined by DRM rules. When a user purchases or registers an electronic work, the user may be provided with a list of available types of licenses. Different costs may be associated with different types of licenses. Furthermore, it will be understood that in addition to the example types of licenses available, other types of licensing agreements may be available and licensing agreements may be tailored for a particular user.

A purchase controller 708 controls the purchase of licensed electronic works. As previously described, license controller 702 controls a user purchase of a license for an electronic work already stored on a player. Alternatively, the user may purchase an electronic work stored in electronic work database 712 and specify the type of license preferred for the work. Then, purchase controller 708 controls the purchase of the electronic work and license and stores a record of the purchase in purchase database 710.

Advantageously, a prospective purchaser of an electronic work may be offered an incentive to purchase the electronic work. For example, the incentive may be in the form of an electronic coupon. An incentive controller 714 preferably applies incentives to electronic works and licenses distributed by licensed electronic work distribution server 206. Incentives may be added as a separate secure and authenticated file or may be added in the distribution cookie or DRM rules file. Records of distributed incentives are stored in incentive database 716. Further, incentive controller 714 preferably controls redemption of incentives received from purchasers.

Incentives may include conditions for redemption and may adjust in value depending on recipient responses to an electronic work. Thus, to redeem an incentive, a distribution cookie may be used to monitor the distribution history of the electronic work and responses to the electronic work by recipients. For example, a user may receive an incentive of a rebate on the purchase of the electronic work for every purchase of the electronic work by a recipient of a wireless broadcast of the electronic work from the user. In another example, each recipient of an electronic work may receive a discount on purchase of the electronic work in response to rating the electronic work or writing a review comment about the electronic work.

A distribution cookie controller 720 preferably attaches a distribution cookie to each transaction with licensed electronic work distribution server 206. The distribution cookie may include distributor information, purchase identification, purchaser identification, and other relevant information describing the initial purchase of an electronic work. Further, a distribution cookie may specify who may access the distribution cookie. In an example of an advantage of the present invention, an independent band may distribute electronic works from a web site dedicated to that band where the distribution cookies attached to the distributed electronic works are only accessible by the band's server.

Referring now to FIG. 8, there is depicted a block diagram of a statistics server in accordance with the method, system, and program of the present invention. First, distribution cookies accessed by statistics server 220 are stored in a distribution cookie database 804. An analysis controller 802 analyzes distribution cookies in distribution cookie database 804 to organize data for use in multiple ways including, but not limited to, determining distribution rates, assigning hot distribution ratings, tracking the original purchaser of a broadcast electronic work purchased by a recipient, determining ratings for electronic works, and determining ratings for reviewers of electronic works. Examples of analyzed distribution cookies are illustrated in Tables 2-4. The organized data is preferably stored in distribution statistics database 806.

A statistic recipient database 810 preferably organizes the intended recipients of distribution cookie information according to the type of information to be distributed. Businesses, for example, may subscribe as a recipient of distribution cookie information. Statistics distribution controller 808 compares entries in distribution cookie database 804 and distribution statistics database 806 with the distribution preferences of recipients in statistic recipient database 810 and controls distribution of information from databases 804 and 806 to intended recipients.

According to one advantage of statistics server 220, where multiple users respond to a particular electronic work with positive ratings or purchases, then ad-hoc networks of users can communicate preferences for electronic works and force a firestorm of activity surrounding a particular electronic work. Advantageously, such a firestorm of activity can then be used by a distributor or promoter to better target promotion of an electronic work and the artist(s) of an electronic work.

With reference now to FIGS. 9A-9D, there are depicted illustrative representations of display choices presented to a user of a player enabled to receive, store, and broadcast electronic works in accordance with the method, system, and program of the present invention. As illustrated in FIG. 9A, responsive to a player detecting a wireless broadcast, the user is prompted to authorize reception of a distribution cookie before playback of the electronic work will be allowed. While in the example the user is prompted to receive a distribution cookie, in an alternate embodiment, the user may set a preference to always receive distribution cookies or to receive distribution cookies for particular types of electronic works, to receive distribution cookies from particular broadcasters, and other specifications.

As illustrated in FIG. 9B, the user is prompted to rate the electronic work. The user may also be prompted to rate overall the selection of works received from a particular primary player. Further, the user may be prompted to rate particular characteristics of a work and to write comments about a particular work or group of works. The prompting may be displayed while a user is listening to a synchronous playback of a current broadcast or when the user is listening to playback of a stored sample from a broadcast. The rating scale presented to the user may be specified by the DRM rules, specified by the user, or arbitrarily selected.

As depicted in FIG. 9C, the user is prompted to select whether to receive purchase options for the electronic work received from a wireless broadcast. In particular, when a secondary player receives a wireless broadcast of an electronic work, the purchasing information for that electronic work is preferably transferred to and stored at the secondary player. A user may be automatically prompted to select whether to initiate a purchase of a licensed copy of a broadcast electronic work as depicted. Alternatively, a user may be prompted to only select whether to initiate a purchase of those broadcast electronic works which the user rates favorably.

As illustrated in FIG. 9D, the user may alternatively be prompted to select whether to redeem an electronic coupon to purchase the electronic work. If a user selects to redeem an electronic coupon to purchase the electronic work, then a purchase is preferably initiated with a licensed electronic work distribution server when the server is accessible via a network.

Figure 10:
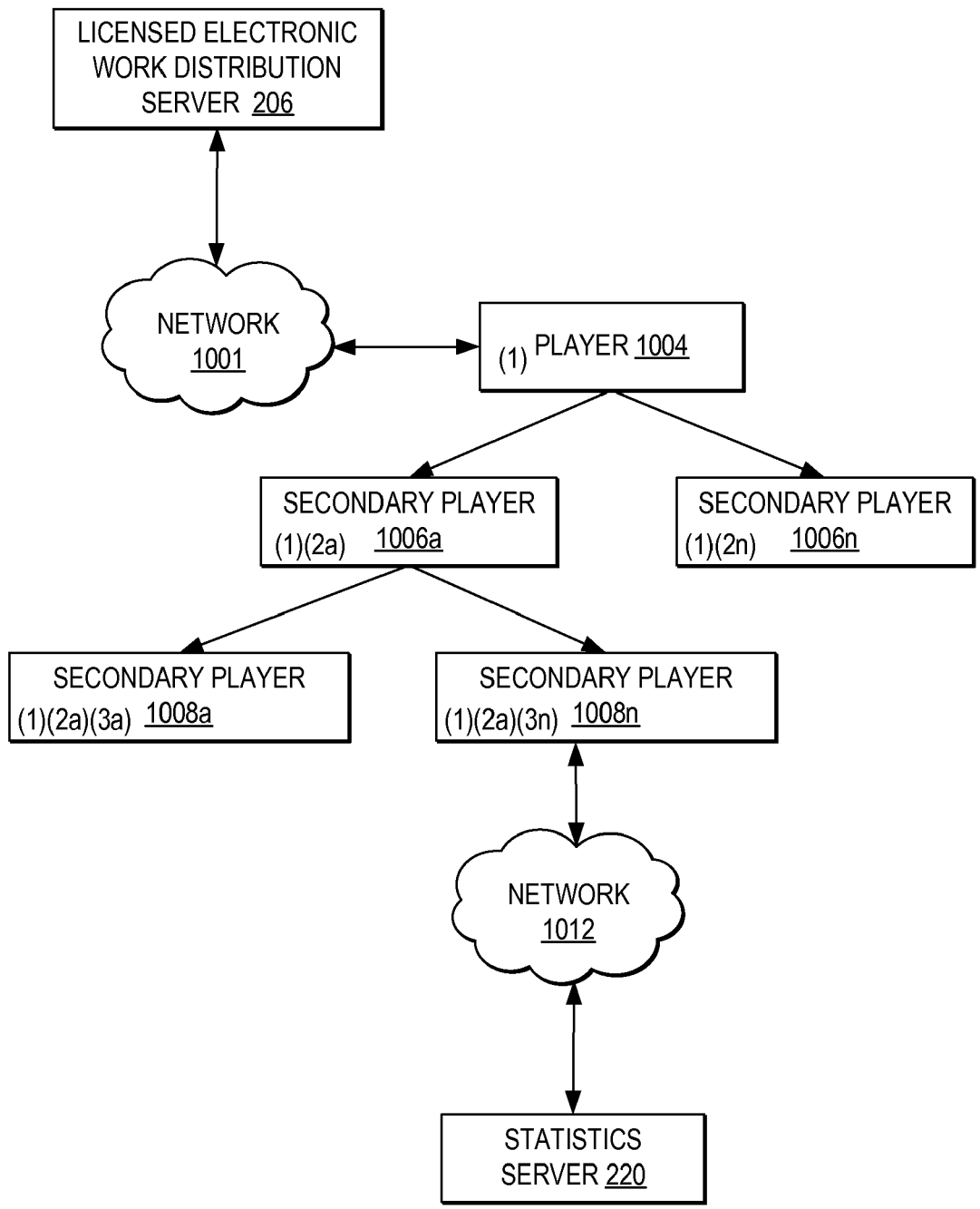
FIG. 10 is an illustrative diagram of the distribution of an electronic work in accordance with the method, system, and program of the present invention.

Referring now to FIG. 10, there is depicted an illustrative diagram of the distribution of an electronic work in accordance with the method, system, and program of the present invention. As illustrated, a licensed electronic work distribution server 206 distributes electronic works via network 1001 with distribution cookies for tracking the paths of distribution. A path of distribution may be viewed as a tree with many branches where each recipient of the electronic work is considered a node. In the example, distribution server 206 distributes an electronic work to player 1004. This is the first level of distribution as indicated by (1). Player 1004 then wirelessly broadcasts the electronic work to secondary players 1006a-1006n. This is the second level of distribution as indicated by (1)(2a) and (1)(2n). Each of the players receiving the wireless broadcast preferably update a distribution cookie received with the broadcast to indicate the distribution path. Secondary player 1006a then wirelessly broadcasts the electronic work to secondary players 1008a-1008n. This is the third level of distribution as indicated by (1)(2a)(3a) and (1)(2a)(3n). When secondary player 1008n connects to network 1012, the distribution cookie updated at secondary player 1008n is accessed by statistics server 220. In particular, the distribution cookie updated at secondary player 1008n preferably indicates the path of (1)(2a)(3n). Advantageously, a distribution rate, review ratings, and other information can be gathered from the distribution cookie updated along the path.

Figure 11:
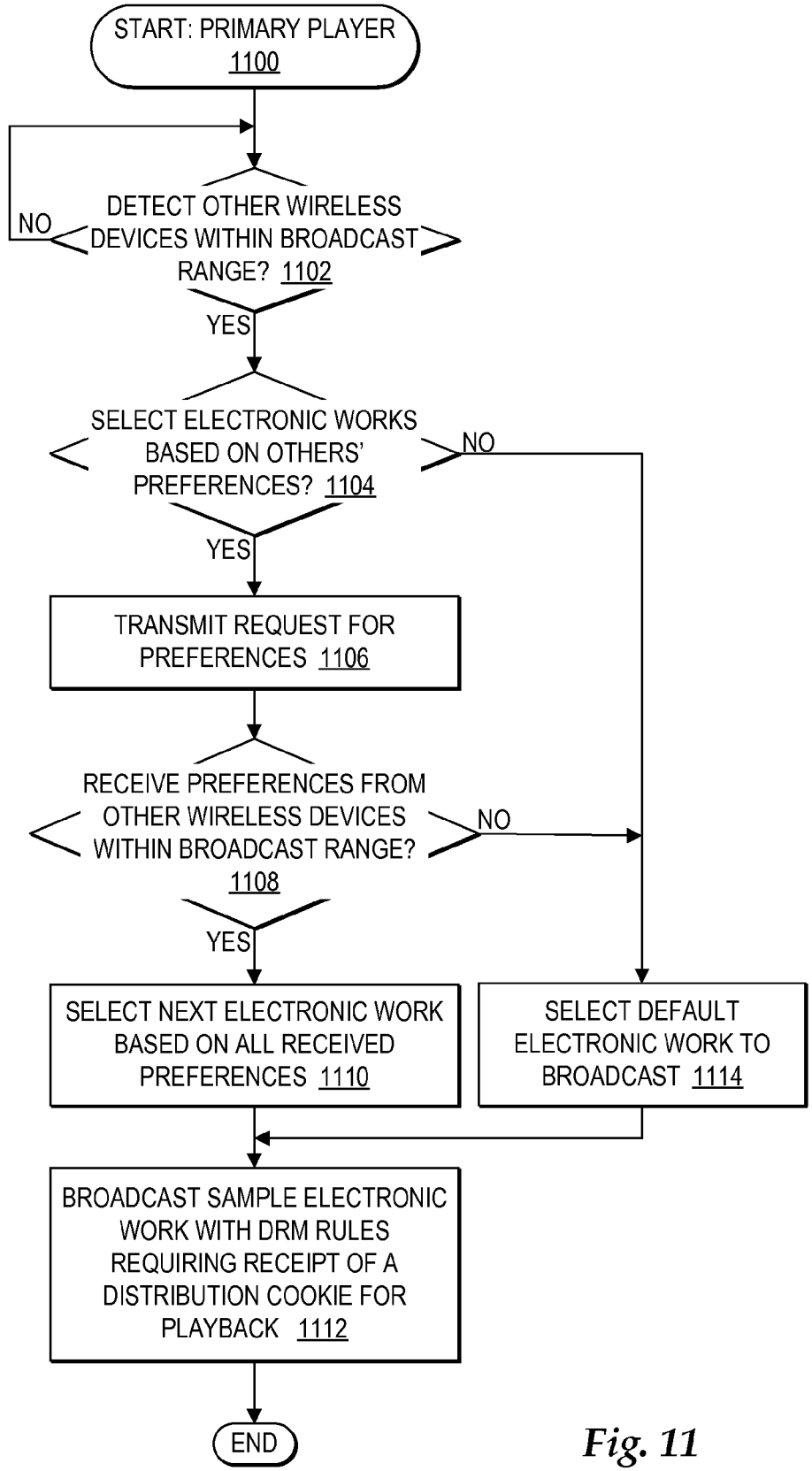
FIG. 11 is a high level logic flowchart of a process and program for controlling a wireless broadcast of an electronic work from a primary player in accordance with the method, system, and program of the present invention.

With reference now to FIG. 11, there is illustrated a high level logic flowchart of a process and program for controlling a wireless broadcast of an electronic work from a primary player in accordance with the method, system, and program of the present invention. As depicted, the process starts at block 1100 and thereafter proceeds to block 1102. Block 1102 depicts a determination whether other devices within the DRM-allowed broadcast range are detected. In particular, a DRM rule for broadcast of a particular electronic work preferably specifies the connection types, broadcast ranges, and other broadcast limitations and preferences. If other devices are not detected, then the process iterates at block 1102. If other devices are detected, then the process passes to block 1104.

Block 1104 depicts a determination whether the setting to select electronic works based on others' preferences is selected. The DRM rules may require a selection of electronic works based on preferences. Alternatively, a user at a primary player may require a selection of electronic works based on preferences. If the selection based on preferences is not required, then the process passes to block 1114. Block 1114 depicts selecting a default electronic work to broadcast. Alternatively, at block 1104, if the selection based on preferences is required, then the process passes to block 1106. Block 1106 illustrates transmitting a request for preferences to the other wireless devices and the process passes to block 1108. In particular, the request for preferences may specify which categories of preferences are requested based on DRM rules or a user specification. For example, the request for preferences may specify the category of musician preferences and musical style preferences.

Block 1108 depicts a determination whether preferences from other wireless devices within broadcast range are received. If no preferences are received, then the process passes to block 1114. If preferences are received, then the process passes to block 1110. Block 1110 depicts selecting the next electronic work to broadcast based on all the received preferences. In particular, the process may also require that the electronic work include DRM rules that allow for wireless broadcasting. Further, the primary player may offload the electronic work selection process to a digital DJ located in another electronic device accessible via a network. Moreover, the playback controller may further filter the sets of preferences received to only select the next electronic work for broadcast based on a selection of the preferences received from secondary players, such as musician preferences. Next, block 1012 depicts broadcasting the sample electronic work with DRM rules requiring a recipient to receive a distribution cookie for playback of the electronic work, and the process ends.

Figure 12:
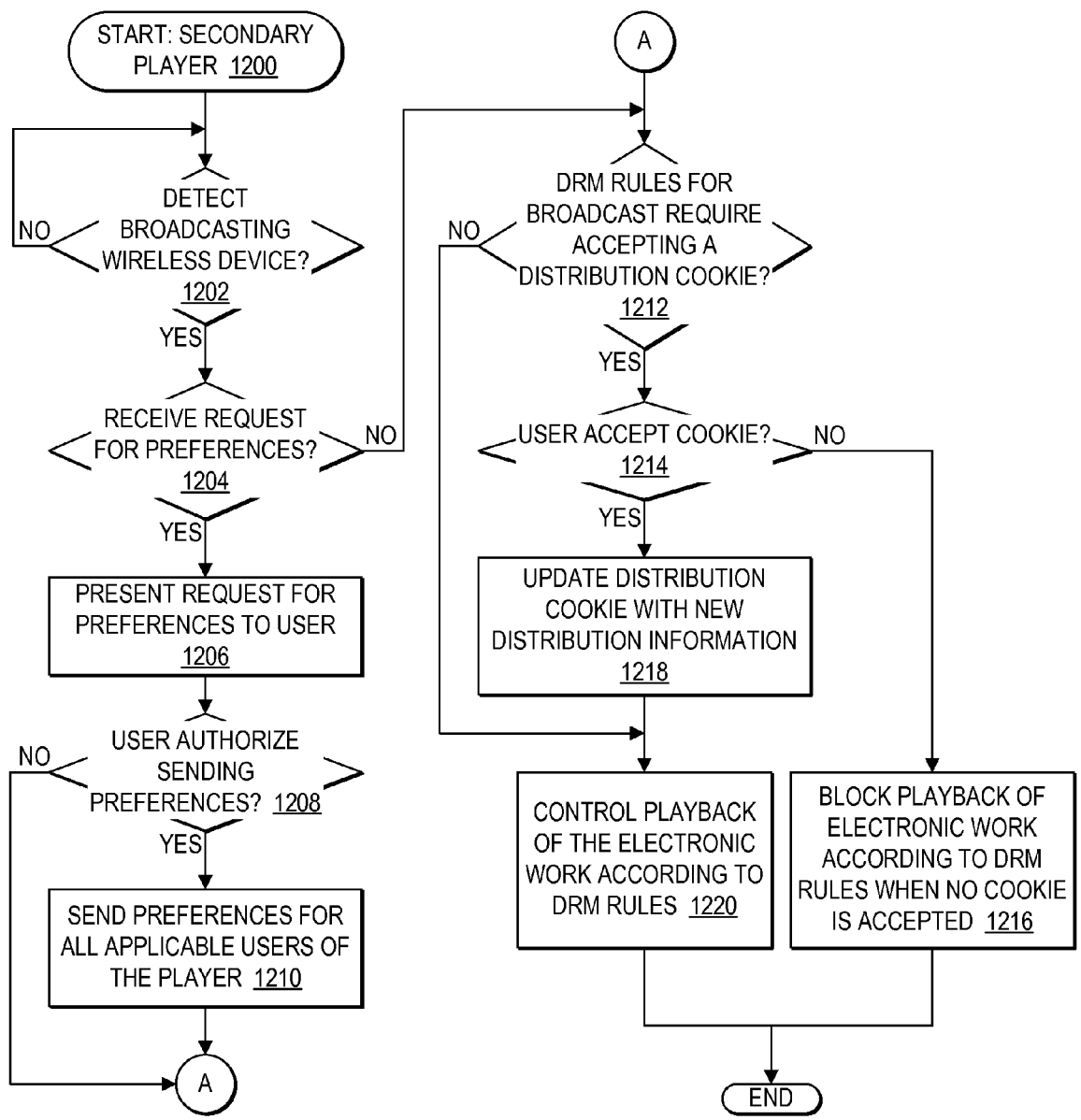
FIG. 12 is a high level logic flowchart of a process and program for controlling receipt of a broadcast electronic work at a secondary player in accordance with the method, system, and program of the present invention.

Referring now to FIG. 12, there is illustrated a high level logic flowchart of a process and program for controlling receipt of a broadcast electronic work at a secondary player in accordance with the method, system, and program of the present invention. As illustrated, the process starts at block 1200 and thereafter proceeds to block 1202. Block 1202 illustrates a determination of whether a broadcasting wireless device is detected. If a broadcasting wireless device is not detected, then the process iterates at block 1202. If a broadcasting wireless device is detected, then the process passes to block 1204. Block 1204 illustrates a determination whether a request for preferences is received. If a request for preferences is received, then the process passes to block 1206. If a request for preferences is not received, then the process passes to block 1212.

If the process passes to block 1206, a request is presented for the user to authorize sending preferences. Next, block 1208 depicts a determination whether the user authorizes sending preferences. If the user does not authorize sending preferences, then the process passes to block 1212. If the user does authorize sending preferences, then the process passes to block 1210. Block 1210 illustrates sending preferences for all applicable users of the player, and the process passes to block 1212. User preferences may be set by the device owner, the current user, or a group of users.

Block 1212 illustrates a determination whether DRM rules for the broadcast electronic work require accepting a distribution cookie. If the rules do not require accepting a distribution cookie, then the process passes to block 1220. If the rules do require accepting a distribution cookie, then the process passes to block 1214. Block 1214 depicts a determination whether the user accepts the cookie. The user may set a preference that automatically accepts or rejects the distribution cookie. Alternatively, the user may set a preference to be prompted to accept or reject the distribution cookie. If the user does not accept the distribution cookie, then the process passes to block 1216. Block 1216 illustrates blocking playback of the electronic work according to DRM rules when no cookie is accepted, and the process ends. Alternatively, if the user does accept the cookie, then the process passes to block 1218. Block 1218 depicts updating the distribution cookie with new distribution information for the secondary player and users of the secondary player. Next, block 1220 illustrating controlling playback of the electronic work according to DRM rules, and the process ends.

Figure 13:
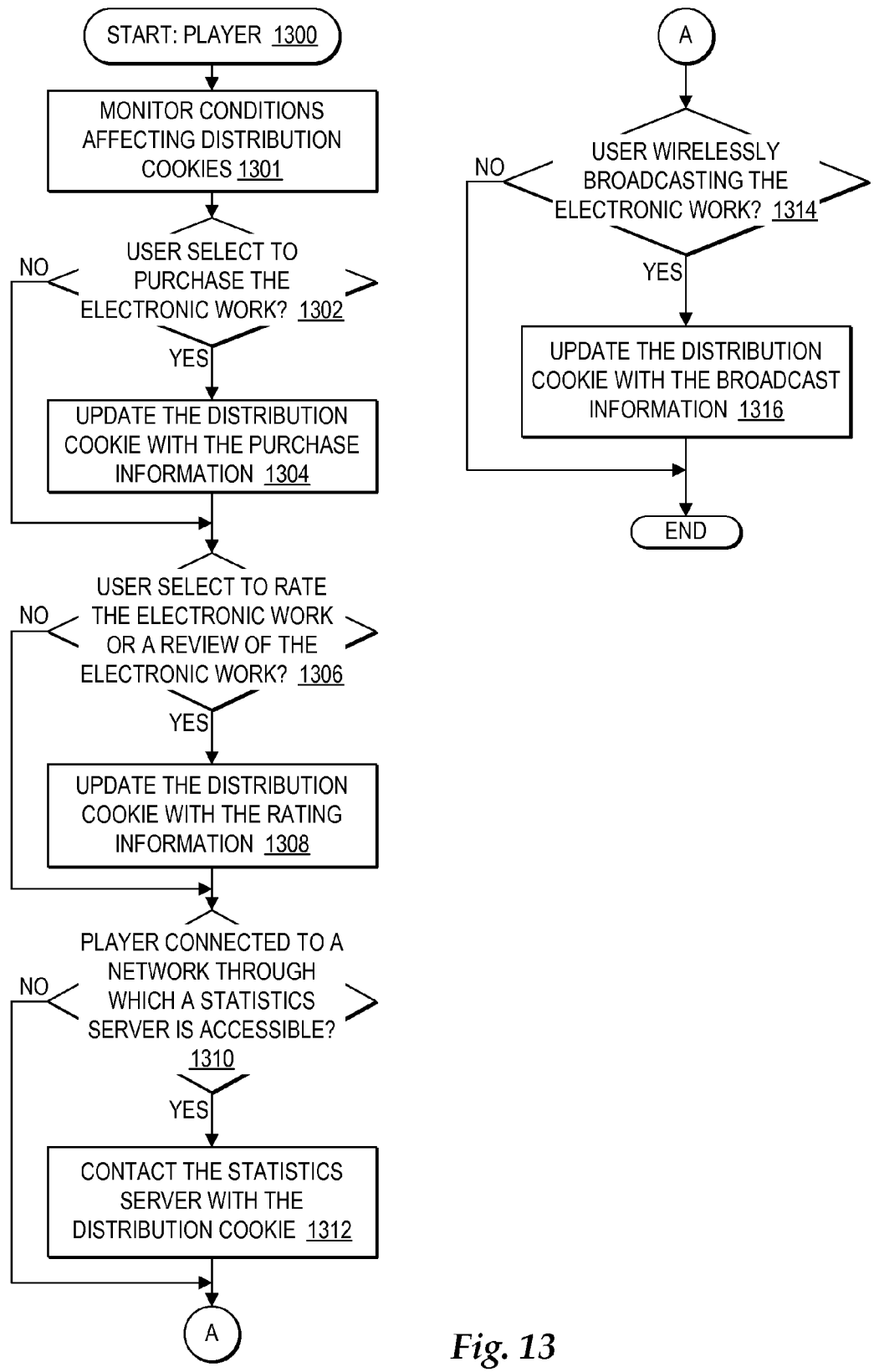
FIG. 13 is a high level logic flowchart of a process and program for updating and transmitting a distribution cookie in accordance with the method, system, and program of the present invention.

With reference now to FIG. 13, there is depicted a high level logic flowchart of a process and program for updating and transmitting a distribution cookie in accordance with the method, system, and program of the present invention. As illustrated, the process starts at block 1300 and thereafter proceeds to block 1301. Block 1301 depicts monitoring the conditions affecting distribution cookies, and the process passes to block 1302. While each of the decision processes following are depicted in processing, each one may be separately monitored and triggered. The decision processes are only intended to illustrate the types of conditions that may be monitored that would affect distribution cookies stored on a player.

Block 1302 depicts a determination whether the user has selected to purchase the electronic work. If the user does not select to purchase an electronic work, then the process passes to block 1306. If the user does select to purchase an electronic work, then the process passes to block 1304. Block 1304 depicts updating the distribution cookie for the purchased electronic work with the purchase information, and the process passes to block 1306.

Block 1306 depicts a determination whether the user selects to rate the electronic work or a review of the electronic work. If the user does not select to rate, then the process passes to block 1310. If the user selects to rate, then the process passes to block 1308. Block 1308 illustrates updating the distribution cookie for the rated electronic work with the rating information, and the process passes to block 1310.

Block 1310 depicts a determination whether the player is connected to a network through which a statistics server is accessible. If the player is not connected, then the process passes to block 1314. If the player is connected, then the process passes to block 1312. Block 1312 illustrates contacting the statistics server with the distribution cookie, and the process passes to block 1314. In particular, a distribution cookie may designate a particular statistics server to contact or the DRM rules may designate which statistics servers to contact.

Block 1314 depicts a determination whether the user is wirelessly broadcasting the electronic work. If the user is not wirelessly broadcasting the electronic work, then the process ends. If the user is wirelessly broadcasting the electronic work, then the process passes to block 1316. Block 1316 illustrates updating the distribution cookie for the broadcast electronic work with the broadcast information, and the process ends.

Figure 14:
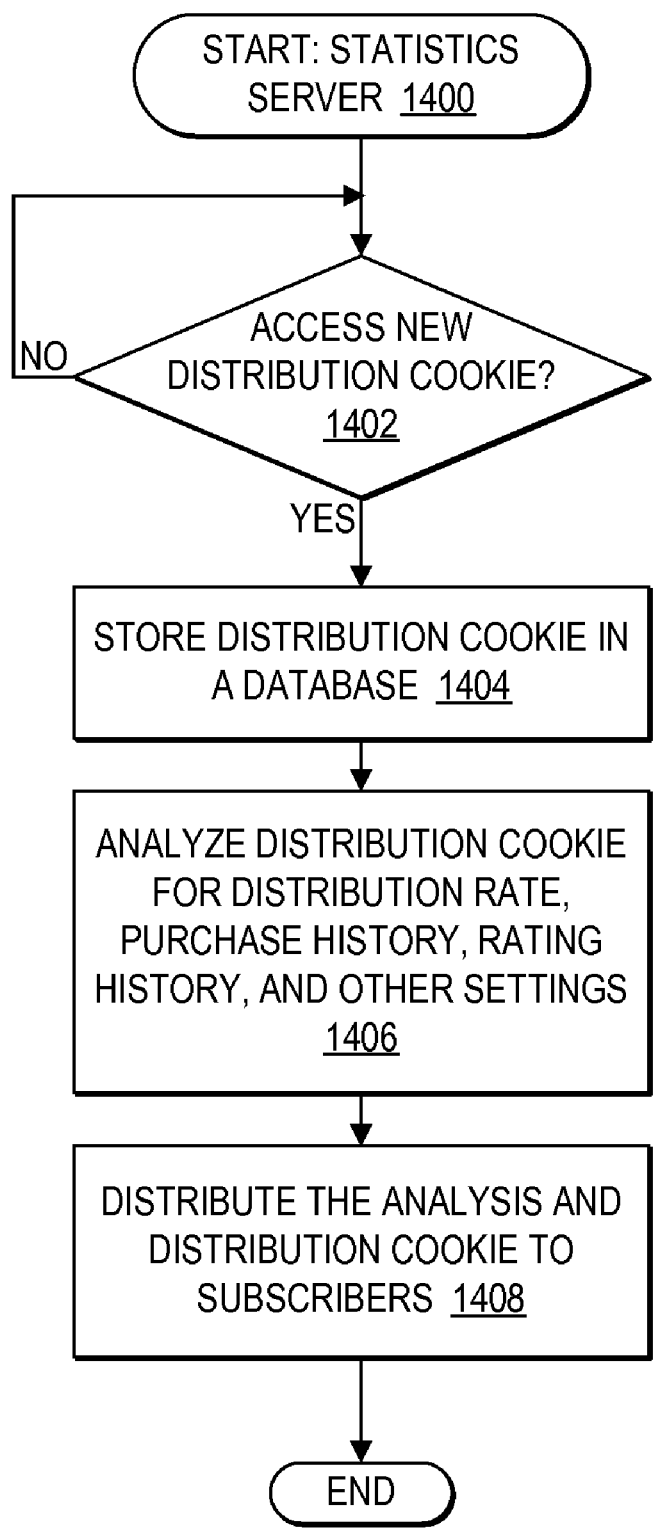
FIG. 14 is a high level logic flowchart of a process and program for controlling a statistics server in accordance with the method, system, and program of the present invention.

Referring now to FIG. 14, there is depicted a high level logic flowchart of a process and program for controlling a statistics server in accordance with the method, system, and program of the present invention. As illustrated, the process starts at block 1400 and thereafter proceeds to block 1402. Block 1402 depicts a determination whether a new distribution cookie has been accessed. If a new distribution cookie has not been accessed, then the process iterates at block 1402. If a new distribution cookie has been accessed, then the process passes to block 1404. Block 1404 illustrates storing the distribution cookie in a database. Next, block 1406 depicts analyzing the distribution cookie for a distribution rate, purchase history, rating history, and other settings. Thereafter, block 1408 depicts distributing the analysis and distribution cookie to subscribers, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for tracking distribution of an electronic work, comprising:
   detecting a localized broadcast of an electronic work from a first player to a second player;
   accepting a distribution cookie from said first player at said second player with said broadcast of said electronic work;
   updating said distribution cookie with tracking information about said broadcast of said electronic work to said second player;
   updating said distribution cookie with a response by a recipient at said second player, wherein said response comprises at least one from among a purchase of said electronic work, a rating of said electronic work, a review of said electronic work, a rating of a review of said electronic work, and a broadcast of said electronic work; and
   responsive to detecting a network connection, providing said distribution cookie to a tracking server, such that localized broadcast distribution of said electronic work is tracked through gathering and analyzing said distribution cookie at said tracking server.

2. The method according to claim 1 for tracking distribution of an electronic work, wherein detecting a localized broadcast of an electronic work further comprises:
   detecting a wireless broadcast of said electronic work from a first player to a second player, wherein at least one from said first player and second player is a portable electronic device.

3. The method according to claim 1 for tracking distribution of an electronic work, wherein accepting a distribution cookie further comprises:
   allowing playback of said electronic work at said second player only if a recipient at said second player accepts said distribution cookie.

4. The method according to claim 1 for tracking distribution of an electronic work, further comprising:
   receiving said distribution cookie at said first player from a distribution server, wherein said distribution cookie identifies at least one from among said distribution server, a purchaser identification, a purchase identification, a time of purchase, a location of purchase, an incentive for distribution of said electronic work, and an incentive for purchase of said electronic work.

5. The method according to claim 1 for tracking distribution of an electronic work, further comprising:

broadcasting said electronic work with said distribution cookie from said second player to a next player; and updating said distribution cookie with information about said broadcast of said electronic work to said next player.

6. The method according to claim 1 for tracking distribution of an electronic work, further comprising:

updating said distribution cookie with a plurality of electronic work ratings of a plurality of electronic works by a recipient at said second player.

7. The method according to claim 1 for tracking distribution of an electronic work, further comprising:

providing said distribution cookie to said tracking server, wherein said tracking server is enabled to gather and analyze said distribution cookie to determine at least one from among a rate of distribution of said electronic work, a marketing area in which said electronic work is favorably received, a purchase rate and history of said electronic work, a current rating response to said electronic work, and a current rating response to at least one comment about said electronic work.

8. The method according to claim 1 for tracking distribution of an electronic work, further comprising:

only providing said distribution cookie to said tracking server if a digital rights rule enables access by said tracking server to said distribution cookie.

9. The method according to claim 1 for tracking distribution of an electronic work, further comprising:

triggering a communication with said tracking server from a link specified in said distribution cookie.

10. A system for tracking distribution of an electronic work, comprising:

a second player detecting a first player locally broadcasting an electronic work;

said second player operative to accept distribution cookie from said first player at said second player with said broadcast of said electronic work;

said second player operative to update said distribution cookie with tracking information about said broadcast of said electronic work to said second player;

said second player operative to update said distribution cookie with a response by a recipient at said second player, wherein said response comprises at least one from among a purchase of said electronic work, a rating of said electronic work, a review of said electronic work, a rating of a review of said electronic work, and a broadcast of said electronic work; and said second player, responsive to detecting a network connection, operative to provide said distribution cookie to a tracking server enabled to analyze said distribution cookie.

11. The system according to claim 10 for tracking distribution of an electronic work, wherein said first player wirelessly broadcasts said electronic work.

12. The system according to claim 10 for tracking distribution of an electronic work, further comprising:

a distribution server operative to distribute said electronic work an said distribution cookie to said first player, wherein said distribution cookie identifies at least one from among said distribution server, a purchaser identification, a purchase identification, a time of purchase, a location of purchase, an incentive for distribution of said electronic work, and an incentive for purchase of said electronic work.

13. The system according to claim 10 for tracking distribution of an electronic work, further comprising:

said second player operative to broadcast said electronic work with said distribution cookie from said second player to a next player; and said second player operative to update said distribution cookie with information about said broadcast of said electronic work to said next player.

14. The system according to claim 10 for tracking distribution of an electronic work, further comprising:

said second player operative to update said distribution cookie with a plurality of electronic work ratings of a plurality of electronic works by a recipient at said second player.

15. The system according to claim 10 for tracking distribution of an electronic work, further comprising:

said tracking server operative to analyze said distribution cookie to determine at least one from among a rate of distribution of said electronic work, a marketing area in which said electronic work is favorably received, a purchase rate and history of said electronic work, a current rating response to said electronic work, and a current rating response to at least one comment about said electronic work.

16. The system according to claim 10 for tracking distribution of an electronic work, further comprising:

said second player operative to only provide said distribution cookie to said tracking server if a digital rights rule enables access by said tracking server to said distribution cookie.

17. The system according to claim 10 for tracking distribution of an electronic work, further comprising:

said second player operative to trigger a communication with said tracking server from a link specified in said distribution cookie.

18. A computer program product for tracking distribution of an electronic work, comprising:

a non-transitory computer readable storage media;

first program instructions to detect a localized broadcast of an electronic work from a first player to a second player;

second program instructions to accept a distribution cookie from said first player at said second player with said broadcast of said electronic work;

third program instructions to update said distribution cookie with tracking information about said broadcast of said electronic work to said second player;

fourth program instructions to update said distribution cookie with a response by a recipient at said second player, wherein said response comprises at least one from among a purchase of said electronic work, a rating of said electronic work a review of said electronic work, a rating of a review of said electronic work, and a broadcast of said electronic work; and fifth program instructions to provide said distribution cookie to a tracking server, responsive to detecting a network connection;

wherein the first, second, third, fourth, and fifth program instruction are stored on the computer readable storage media.

* * * * *